United States Patent
Al-Hasan

(10) Patent No.: US 8,492,917 B2
(45) Date of Patent: Jul. 23, 2013

(54) ELECTRICAL POWER GENERATING SYSTEM

(76) Inventor: Khaled J. Al-Hasan, Al-Zāhra (KW)

( * ) Notice: Subject to any disclaimer, the term of this patent is extended or adjusted under 35 U.S.C. 154(b) by 400 days.

(21) Appl. No.: 12/947,015

(22) Filed: Nov. 16, 2010

(65) Prior Publication Data

US 2012/0119493 A1    May 17, 2012

(51) Int. Cl.
*F03B 13/10* (2006.01)
*F03B 13/12* (2006.01)
*H02P 9/04* (2006.01)

(52) U.S. Cl.
USPC .......................................................... 290/42

(58) Field of Classification Search
USPC ......................................... 290/42, 43, 53, 54
See application file for complete search history.

(56) References Cited

U.S. PATENT DOCUMENTS

| 3,911,287 A | 10/1975 | Neville |
| 4,379,235 A | 4/1983 | Trepl, II |
| 4,443,708 A | 4/1984 | Lapeyre |
| 4,803,839 A * | 2/1989 | Russo, III ...................... 60/501 |
| 5,789,826 A | 8/1998 | Kumbatovic |
| 6,747,363 B2 | 6/2004 | Sanchez Gomez |
| 7,456,512 B2 | 11/2008 | Nadel |

* cited by examiner

*Primary Examiner* — Javaid Nasri
(74) *Attorney, Agent, or Firm* — Lowe Hauptman Ham & Berner, LLP

(57) ABSTRACT

An electrical system for generating electrical energy from the wave motion in a body of water includes a lower tower disposed in a body in a body of water and an adjustable upper portion rising upwardly above the surface of the body of water. A rotatable fuselage includes a floating base fixed to the upper portion of the tower and rotatable about a vertical axis for facing into the wind. A downwardly extending arm is fastened to the fuselage and moves back and forth in response to wave motion. The system also includes a mechanism for raising and lowering the fuselage to accommodate tidal changes. In addition, the forward and backward motion of the downwardly projecting arm rotates a pair of generators for generating electrical energy and transmitting it to a land station.

14 Claims, 4 Drawing Sheets

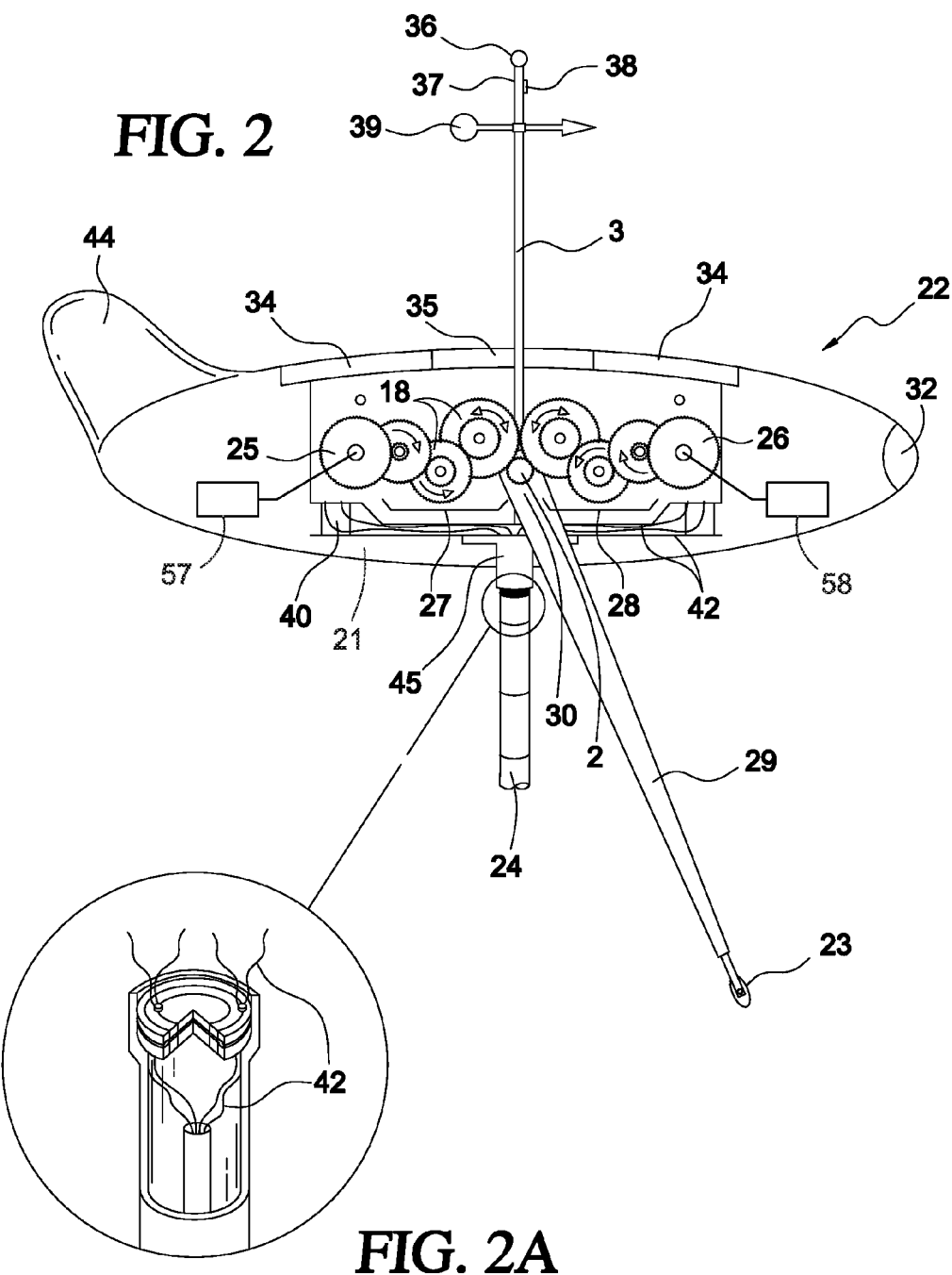

ELECTRICAL POWER GENERATING SYSTEM

FIELD OF THE INVENTION

This invention relates to an electrical power generating system and more particularly to an electrical power generating system for generating electrical energy in response to the wave motion in a body of water.

BACKGROUND FOR THE INVENTION

Wave driven power generators are well known and have been in use for many years. For example, U.S. Pat. No. 3,911, 287 of Neville, discloses a wave driven power generator wherein two one-way clutches on a power output shaft are driven through two oppositely driven power trains driven by a lever arm oscillated by a float raised by waves and lowered by gravity. In an alternate embodiment, a plurality of float oscillated lever arms are spaced apart a fraction of a wave length and drive pairs of one-way clutches on a power output shaft which drives a positive displacement pump. Another embodiment includes a paddle wheel carried by a lever arm oscillated by a float raised and lowered relatively rapidly by waves and relatively slowly by tide, a power output shaft driven unidirectionally by oppositely driven power trains through two one-way clutches, and a current driven paddle wheel carried by the arm and driving the shaft through two additional one-way clutches.

A further example of equipment to extract ocean wave power is disclosed in a U.S. Pat. No. 5,789,826. As disclosed therein a system for harnessing the energy of ocean waves to produce useful energy like electricity is disclosed wherein a power generating apparatus is attached to a support structure located out of the water and on dry land. The support structure comprises a mechanical boom disposed on a base located on the shore and a moveable mounting structure provided with a plurality of hydraulic cylinders such that the power generating apparatus may be moved in all directions and placed in position in the water flow optimal for the generation of power. The power generating apparatus comprises a selectively moveable turbine unit coupled to either a power generating mechanism, such as a generator, or pumping mechanism such that the rotation of the turbine unit due to the impact of the ocean waves can be converted into useful energy. Also disclosed are means for restricting and preventing lateral sliding of a wide belt as it moves over a tank or over a two section straight conveyor having rotating drums, the wide belt and either a tank or conveyor comprising two different embodiments of the invention are disclosed therein.

A still further example of a floating platform harvesting sea wave energy for electric power generation is disclosed in a U.S. Pat. No. 6,747,363 of Gomez. As disclosed therein, a floating platform harvesting sea wave energy comprises a helix or a turbine arranged at the bottom of a containment tube on a horizontal plane and devices to maintain the platform on the valley of the waves when the tide rises the sea level.

Finally, U.S. Pat. No. 7,456,512 of Nadel, discloses a portable sea-powered electrolysis generator. As disclosed, the portable sea-powered electrolysis generator is an apparatus that continually and conveniently harnesses the energy emanating from sea-wave motion in order to propagate hydrogen to be stored for use as a clean, practical and reusable energy source through the process of electrolysis. The motion of waves is used to power a generator that supplies power to water to, through electrolysis, produce hydrogen.

Notwithstanding the above it is presently believed that there is a need and a potential commercial market for an improved electrical powered generating system for generating electrical energy in response to the wave motion in a body of water. There should be a demand for such system in accordance with the present invention because such systems include a number of advantages over the prior art such as a self-positioning fuselage that moves up and down as the tide comes in and goes out and automatically positions itself with respect to the direction of wind and wave movement. Further, it is believed that the system in accordance with the present invention can be manufactured and sold at a competitive cost, is relatively durable and will produce clean energy without harm to the environment.

BRIEF SUMMARY OF THE INVENTION

In essence, an electrical system for generating electrical energy from wave motion in a body of water includes a tower, including a lower part disposed in a pre-selected location in a body of water and a compensatible upper part rising upwardly above the surface of the body of water. The system also includes a rotatable fuselage including a flotable base fastened to the compensatible upper part of said tower, rotable about a vertical axis for facing into the direction of the wind and a downwardly extending moveable arm disposed on the fuselage for moving forward and backward in response to wave motion. Further, the system includes means to compensate for tide height by raising and lowering the compensatible upper part of said tower and said rotateable fuselage to maintain the fuselage on the surface of the body of water. Further, a pair of generators and a plurality of gears are driven by the forward and backward movement of the downwardly extending moveable arm and cable means are provided for transferring electrical energy from the generators to a power station or grid.

The invention will now be described in connection with the accompanying drawings wherein like reference numerals have been used to indicate like parts.

DESCRIPTION OF THE DRAWINGS

FIG. 2 is a schematic illustration of a gear assembly and cover for the upper portion of the tower and interior of the fuselage shown in FIG. 1;

FIG. 2A is an exploded portion from FIG. 2;

DESCRIPTION OF THE PREFERRED EMBODIMENTS OF THE INVENTION

Figure 1:
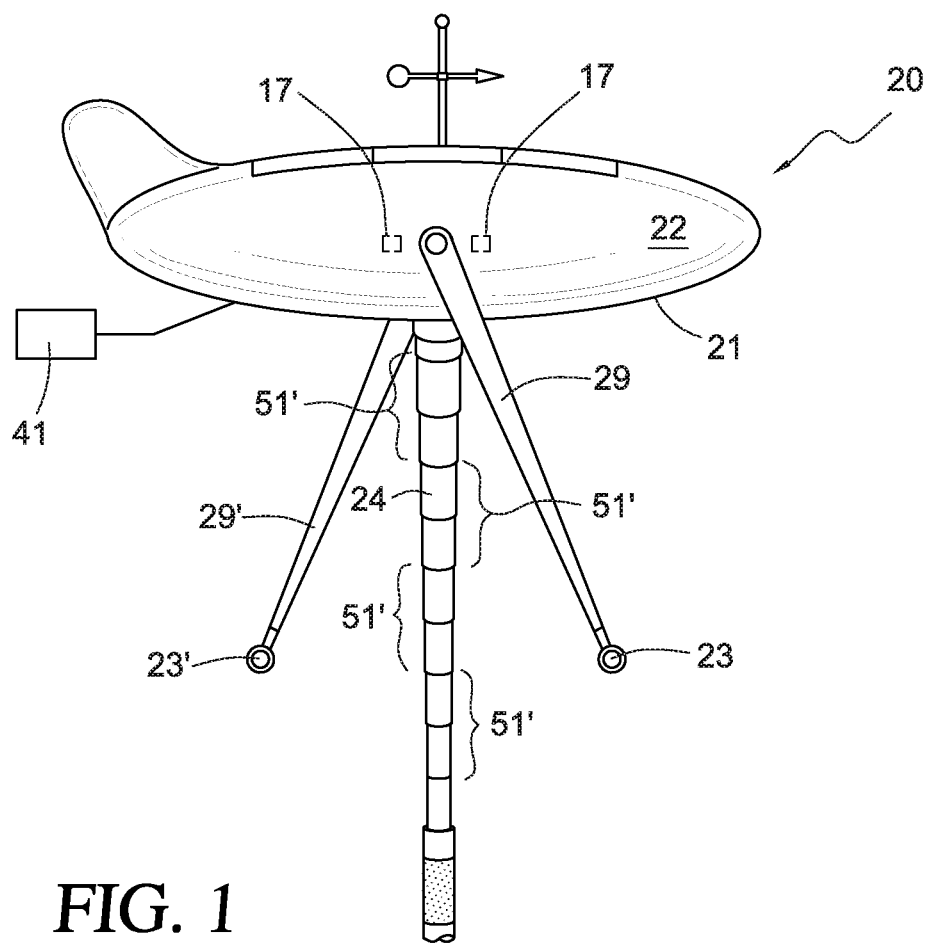
FIG. 1 is a side elevational view of an upper portion of a tower with a rotateable fuselage in accordance with the present invention.

As shown in FIG. 1, a system 20 for generating electrical power from the wave motion in a body of water includes a housing or fuselage 22 that may be made of a relatively hard plastic that is sealed to prevent water from leaking into a hollow cavity in the interior thereof. The fuselage 22 having a floatable base 21 is fixed to or fastened to a lower tower 24.

The fuselage 22 includes a pair of generators 25 and 26 and two sets of gears 27 and 28 both of which are driven by a downwardly extending paddle arm 29 in response to the forward and reward wave motion. Each gear set is constructed and arranged to react to the rotation of gear 30 that is fixed to the paddle arm 29 to thereby rotate an adjacent gears in both direction. For example, when the wave motion pushes the paddle arm 29 rearward the gears in first set 27 will rotate in response to the movement and also the second set of gear 28 will rotate in the other direction. And so, the generators 25 and 26 rotate in the same time to generate the electric power.

The fuselage 22 includes a nose cone 32, two sets of photo cells 34 on an upper surface of the fuselage 22 and a cover 35 that includes a seal to prevent water from entering into the interior of the fuselage 22. As illustrated in FIG. 2, a red warning light 36 is fixed to a top of the upper tower 3. In addition, an anemometers 37, electronic compass 38 and direction indicator 39 are attached to the upper tower 3. The interior of the fuselage 22 also contains a rechargeable battery 40 which is connected by cable to the anemometer 37, and electric compass 38 to a power station 41.

The fuselage also includes a wind vain 44 that is constructed a dimensioned in the shape of an aircraft's rudder on a rear portion of the fuselage 22. The fuselage 22 rotates freely about a vertical axis so that the wind acting on the wind vain 44 maintains the fuselage 22 facing into the wind.

When the fuselage rotate the paddle arm 29 rotate. Further, a positioning gear 45 is disposed on the bottom of the fuselage 22 for indicating the direction of the wind. Finally, the shaft 2 is rotated by the downwardly extending paddle arm 29 to thereby transmit rotational movement from the paddle arm 29 to the gear sets 27 and 28. The movement of the gear sets 27 and 28 is transmitted to the two generators 25, and 26. When the two generators rotate they produce electric power which is transferred to the power station through electric cable 42.

Figure 3A:
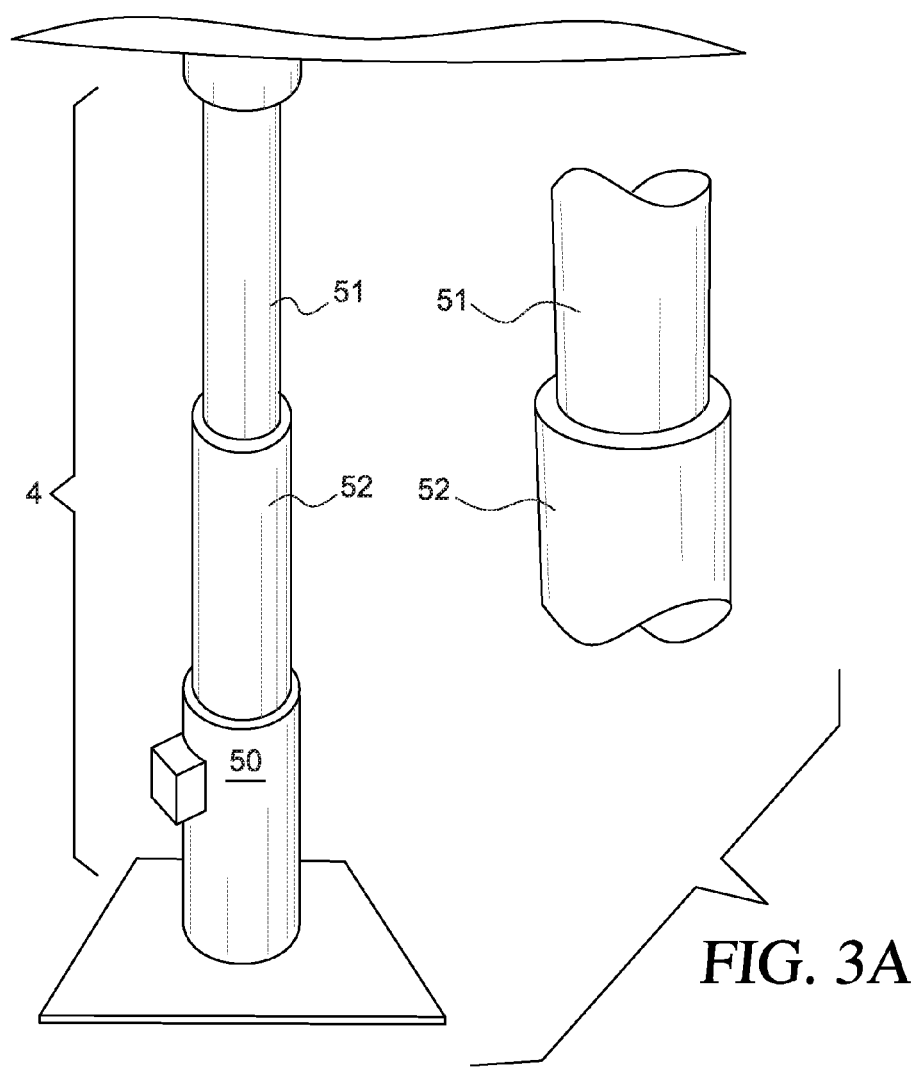
FIGS. 3A and 3B are schematic illustrations of an upwardly extending telescopic tube as used in a tower in accordance with the present invention.
Figure 3B:
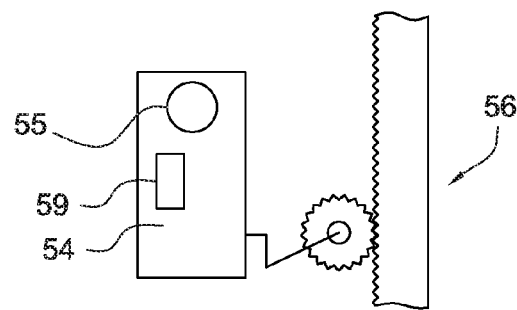
Figure 4:
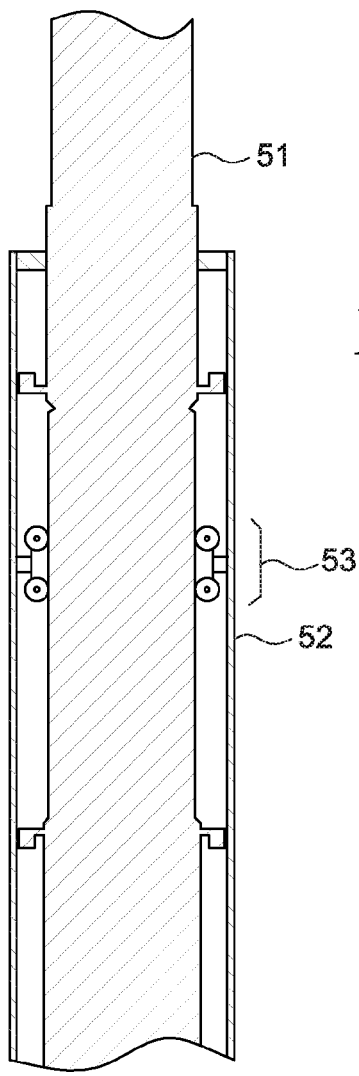
FIG. 4 is a cross-sectional view of a telescopic tube for the tower shown in FIG. 3.
Figure 5:
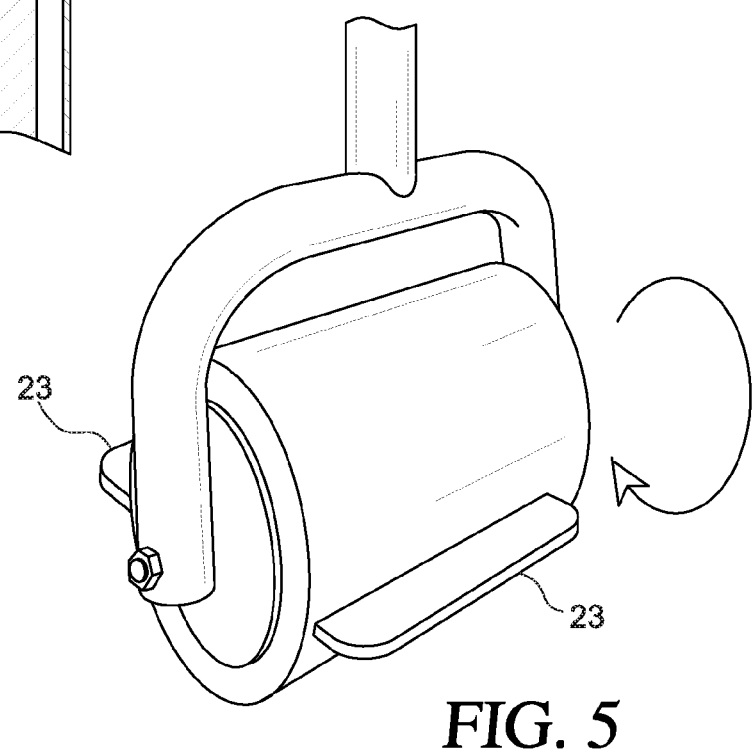
FIG. 5 is a perspective view of a rotating paddle as disposed on a moveable arm in accordance with one embodiment of the present invention.

The lower tower 24 as illustrated in FIGS. 3A and 3B will typically be made of stainless steel or rigid plastic tubes as for example upper and lower telescopic tubes 51 and 52 respectively. Typically, four sets (FIG. 1) of such tubes are provided in the lower part of the tower 24 while a single upwardly tubular member may be sufficient for the upper portion of the tower 24. As shown more clearly in FIGS. 3A, 3B and 4, the tubular member 51 slides into the tube 52 and is separated therefore by a ball bearing assembly 53. in addition, a controller 54 that includes a clock mechanism 55 and set of tide tables actuates a rack and pinion assembly 56 (FIG. 3B) as the tide changes to raise and lower the fuselage 22 to thereby maintain the fuselage on the surface of the water as the tide changes. Two motors 57, 58 rotate one or two pinion gears as in the assembly 56 to raise and lower the tower 24. a pair of limit switches 17 (FIG. 1) prevents the lower tower 24 from exceeding its upper and lower limits.

In the end of the paddle arm 29 there is an oval shaped paddle 23 which is rotate according to the movement of the fuselage 22. When the oval paddle 23 rotates the paddle arm 29 move and so gears rotate transferring the motion to the generator which produce electric power to power station through cable 42 in FIGS. 2 and 2A.

Finally, a further embodiment of the invention uses a generally horizontal arm with float at one end thereof for sensing the up and down movement of the wave having a crest and a trough to rotate the gears and ultimately the generators.

What is claimed is:

1. An electrical system for generating electrical energy from wave motion in the body of water said electrical system comprising:

a compensable lower tower, rotatable fuselage including a floatable base fastened to said compensable lower tower, rotatable about a vertical axis for facing into the direction of wind and downwardly extending moveable paddle arm including an oval shaped paddle end disposed on said fuselage for moving forward and backward in response to wave motion;

said lower tower which raises the fuselage over the water which comprises:

stainless steel or rigid plastic upper and lower telescopic tubes;

four sets of said tubes are provided in a lower part of the lower tower while a single upwardly extending tubular member forms an upper portion of the lower tower;

a controller that includes a clock mechanism and set of tide tables actuates a rack and pinion assembly as the tide changes to raise and lower the fuselage to thereby maintain the fuselage on the surface of the water as the tide changes;

two motors rotate one or two pinion gears in the assembly to raise and lower the tower, a pair of limit switches prevents the lower tower from exceeding its upper and lower limits;

an upper tower has a warning light indicator, anemometer, and direction indicator;

said paddle arm rotates according to the movement and rotation of said oval shaped paddle end;

means to compensate for the tide height by raising and lowering said compensable lower tower and said fuselage to maintain said fuselage on the surface of the body of water;

a pair of generators and a plurality of gears driven by the forward and reverse movement of said downwardly extending paddle arm; and electrical cable to transfer the electrical energy to a power station or grid.

2. An electrical system for generating electrical energy from wave motion in a body of water according to claim 1 which includes a main gear and said plurality of speed gears in a gear box and wherein said main gear and said speed gears rotate in response to movement of said downwardly extending arm and rotate said generators to thereby generate electrical energy.

3. An electrical system for generating electrical energy from wave motion in a body of water according to claim 2 which includes said warning light on an upper portion of said upper tower and wherein said warning light is powered by the output of said generators.

4. An electrical system for generating electrical energy from wave motion in a body of water according to claim 2 which includes a wind guide vain for positioning said fuselage facing into the wind.

5. An electrical system for generating electrical energy from wave motion in a body of water according to claim 4 in which said guide vain resembles an aircraft rudder on a rear portion of said fuselage.

6. An electrical system for generating electrical energy from wave motion in a body of water according to claim 4 in which said fuselage is attached to said upper part of said lower tower by a positioning gear.

7. An electrical system for generating electrical energy from wave motion in a body of water according to claim 4 in which said anemometer, said direction indicator and an electronic compass are disposed in a upper part of said upper tower.

8. An electrical system for generating electrical energy from wave motion in a body of water according to claim 7 which includes a plurality of photo cells and a rechargeable battery chargeable from said photo cells for powering said warning light, anemometer and electronic compass.

9. An electrical system for generating electrical energy from wave motion in a body of water according to claim 8 which includes a power station separated from said towers and cable means for sending outputs from said tower to said power stations.

10. An electrical system for generating electric power from the wave motion in a body of water, said electrical system comprising:
   a lower tower including a lower part disposed in a preselected location in the body of water and compensable upper part rising upwardly above the surface of the body of water and wherein said upper part of said lower tower is joined to said lower part by a plurality of telescope tubes so that the upper part of said tower is moveable up and down;
   a rotatable fuselage including a floatable base fastened to said compensatible compensable lower tower, rotatable about a vertical axis for facing into the direction of the wind and a downwardly extending moveable paddle arm and oval paddle end disposed on said fuselage for moving forward and backward in response to wave motion;
   means including a plurality of said telescoping tubular members and means for moving an upper part of said tower up and down with respect to said lower part of said tower to compensate for the height of the tide and for maintaining said fuselage on the surface of the water;
   an upper tower has a warning light indicator, anemometer, and direction indicator;
   said paddle arm which rotates according to the movement and rotation of said oval shaped paddle end;
   means to compensate for the tide height by raising and lowering said compensable lower tower and said fuselage to maintain said fuselage on the surface of the body of water;
   a pair of generators and a plurality of gears driven by the forward and reverse movement of said downwardly extending paddle arm; and
   electrical cable to transfer electrical energy to a power station or grid.

11. An electrical system for generating electrical energy from wave motion in a body of water according to claim 10 in which the means for compensating the height of said upper part of said tower includes a tide table, a clock, a computer and a rack and pinion gear assembly.

12. An electrical system for generating electrical energy from wave motion in a body of water according to claim 11 which includes a plurality of rotatable paddles on the end of said downwardly extending arms.

13. An electrical system for generating electrical energy from wave motion in a body of water according to claim 12 in which said upper and said lower part of said tower include a telescopic tube and wherein one of said tubes is separated by the other of said tube by a plurality of roller bearings.

14. Method for generating electrical energy from wave motion in the body of water on electrical system which comprises:
   a lower tower include a lower part disposed in a pre-selected location in the body of water and a compensable upper part of said lower tower rising upwardly above the surface of the body of water and wherein said upper part of said lower tower is joined to said lower part by a plurality of telescope tubes so that the upper part of said tower is moveable up and down;
   a rotatable fuselage including a floatable base fastened to said compensable lower tower, rotatable about vertical axis for facing into the direction of wind and downwardly extending moveable paddle arm having an oval shaped paddle end disposed on said fuselage for moving forward and backward in response to wave motion;
   means including a plurality of said telescoping tubular members and means for moving an upper part of said tower up and down with respect to said lower part of said tower to compensate for the height of the tide and maintaining said fuselage on the surface of the water;
   an upper tower has a warning light indicator, anemometer, and direction indicator;
   a paddle arm rotates according to the movement and rotation of the oval shaped paddle end;
   means to compensate for the tide height by raising and lowering said compensable lower tower and said fuselage to maintain said fuselage on the surface of the body of water;
   a pair of generators and a plurality of gears driven by the forward and reverse movement of said downwardly extending paddle arm; and
   electrical cable to transfer the electrical energy to the power station or grid.

* * * * *